(12) United States Patent
Graupner et al.

(10) Patent No.: US 7,150,014 B2
(45) Date of Patent: Dec. 12, 2006

(54) AUTOMATICALLY DEPLOYING SOFTWARE PACKAGES USED IN COMPUTER SYSTEMS

(75) Inventors: Sven Graupner, Mountain View, CA (US); Holger Trinks, Palo Alto, CA (US); Vadim Kotov, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 712 days.

(21) Appl. No.: 10/264,468

(22) Filed: Oct. 4, 2002

(65) Prior Publication Data

US 2004/0068723 A1 Apr. 8, 2004

(51) Int. Cl.
*G06F 9/445* (2006.01)
*G06F 9/44* (2006.01)
(52) U.S. Cl. ............................ 717/174; 717/168
(58) Field of Classification Search ......... 717/168–178
See application file for complete search history.

(56) References Cited

U.S. PATENT DOCUMENTS 6,381,742 B1 * 4/2002 Forbes et al. ............... 717/176

OTHER PUBLICATIONS

"Agent-based configuration management of distributed applications", Berghoff, J.; Drobnik, O.; Lingnau, A.; Monch, C.; Configurable Distributed System, 1996, Proceedings., Third International Conference on May 6-8, 1996, pp. 52-59.*
"Web Hacking: Attacks and Defense", By Stuart McClure, Saumil Shah, Shreeraj Shah, Publisher: Addison Wesley Professional Pub Date: Aug. 8, 2002, ISBN: 0-201-76176-9, excerpts.*
"Essential SNMP", By Douglas Mauro, Kevin Schmidt, O'Reilly Pub Date: Jul. 2001 ,ISBN: 0-596-00020-0, excerpts.*
"Linux in a Nutshell, 3rd Edition"By Stephen Figgins, Jessica P. Hekman, Ellen Siever, Stephen Spainhour, O'Reilly Pub Date: Aug. 2000, ISBN: 0-596-0002, excerpts.*

* cited by examiner

*Primary Examiner*—Wei Zhen
*Assistant Examiner*—Philip Wang
(74) *Attorney, Agent, or Firm*—Tuan V. Ngo

(57) ABSTRACT

Techniques are provided for automatically deploying software packages. Management agents represent these packages, a logical tree represents the deployed structure, and a node of the tree represents a management agent. A node that does not have any child node is referred to as a leaf node. A recursive process associated with at least one repository generates the structure. The repositories include information for configuring the nodes and thus control the deployment process. During deployment, a non-leaf node, referred to as an initiator node, uses information received from a corresponding repository to generate its child nodes. A child node, if being an initiator node, recursively generates its child nodes until the recursive process stops as there is no additional child node to be generated. Further, node identifiers are automatically established and assigned to respective nodes. Those identifiers are used by software instances such as management agents represented by nodes to communicate with other software instances such as repositories or directories for registering information about nodes, looking up information about other nodes, etc.

30 Claims, 5 Drawing Sheets

```
<ENTRY1>
    <PATTERN XPATH = "/*/*/*/*/"/>
    <REF URL = //URL_ADDRESS/REGULAR.XML>
<ENTRY1>

<ENTRY2>
    <PATTERN XPATH = "/*/*/*/"/>
    <PATTERN XPATH = "/*/*/"/>
    <PATTERN XPATH = "/*/"/>
    <PATTERN XPATH = "/"/>
    <REF URL = //URL_ADDRESS/INITIATOR.XML>
<ENTRY2>
```

FIG. 2

AUTOMATICALLY DEPLOYING SOFTWARE PACKAGES USED IN COMPUTER SYSTEMS

FIELD OF THE INVENTION

The present invention relates generally to software packages in computer systems and, more specifically, to automatically deploying such packages.

BACKGROUND OF THE INVENTION

Currently, deploying software packages such as needed for management agents in computer systems is typically manual and difficult to automate. The management agents or other software entities are customarily identified by Internet Protocol (IP) addresses or hostnames and port numbers, which usually depend on the network infrastructure of machines that store the management agents or the software entities. Further, a node or an instance representing a management agent usually requires individual configuration information that is difficult to maintain when the number of instances increases.

Remote software installation and configuration systems have been available in which configuration engines provide centralized configuration information and interfaces for operators to perform remote configuration tasks, usually described in form of scripts. However, configuration engines are also manual or operator-driven, i.e., the operators are required to initiate configurations. Configuration engines are not designed to install and establish whole topologies as controlled processes. A configuration engine initiates only one process, which does not initiate other processes for installing other instances, and does not facilitate automatic assignment of identity and roles to individual instances.

As the systems and their instances become larger, e.g., in the order of 5,000 to 10,000 instances, deployment tasks are becoming more complicated with issues of software distribution, installation, configuration, etc.

Based on the foregoing, it is desirable that mechanisms are provided to solve the above deficiencies and related problems.

SUMMARY OF THE INVENTION1

The present invention, in various embodiments, provides techniques for automatically deploying software packages. In one embodiment, management agents represent these packages, a logical tree represents the deployed structure, and a node of the tree represents an agent. A node that does not have any child node is referred to as a leaf node. A recursive process associated with at least one repository generates the tree. The repositories include information for configuring the nodes and thus control the deployment process. During deployment, a non-leaf node, referred to as an initiator node, uses information received from a corresponding repository to generate its child nodes. A child node, if being an initiator node, recursively generates its child nodes until the recursive process stops, as there is no additional child node to be generated. Further, node identifiers are automatically established and assigned to respective nodes. Those identifiers are used by software instances such as management agents represented by nodes to communicate with other software instances such as repositories or directories for registering information about nodes, looking up information about other nodes, etc.

BRIEF DESCRIPTION OF THE DRAWINGS

The present invention is illustrated by way of example, and not by way of limitation, in the figures of the accompanying drawings in which like reference numerals refer to similar elements and in which:

FIG. 2 is used to illustrate how configurations are selected;

DETAILED DESCRIPTION OF THE PREFERRED EMBODIMENT

In the following description, for the purposes of explanation, numerous specific details are set forth in order to provide a thorough understanding of the present invention. However, it will be apparent to those skilled in the art that the invention may be practiced without these specific details. In other instances, well-known structures and devices are shown in block diagram form in order to avoid obscuring the invention.

Figure 1:
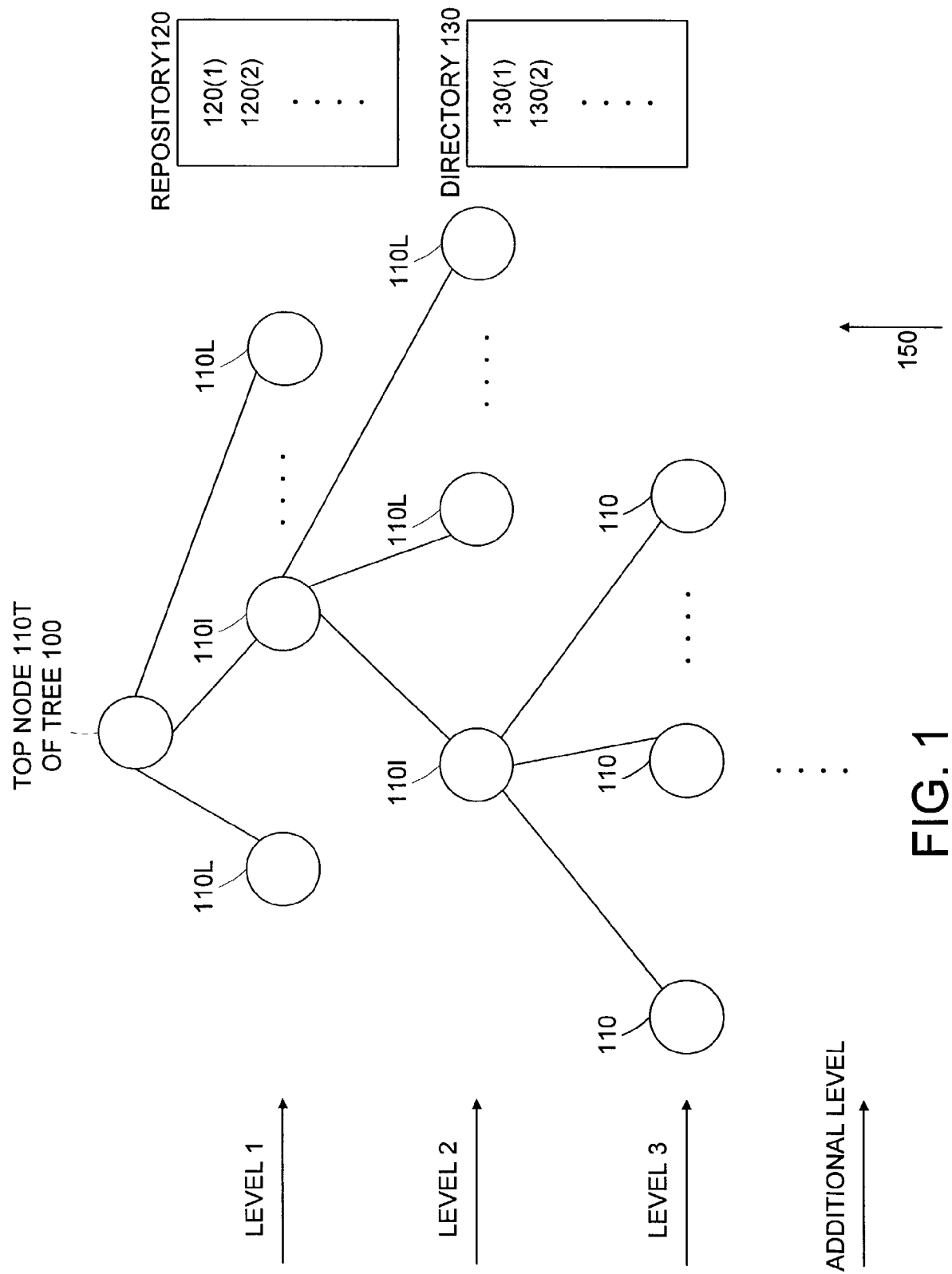
FIG. 1 shows a hierarchical structure upon which embodiments of the invention may be implemented.

FIG. 1 shows a system 150 including a hierarchical or tree structure 100, at least one repository 120, and at least one directory 130, in accordance with one embodiment. Tree 100 includes a plurality of nodes 110 and represents the logical relationship between management agents represented by nodes 110. A plurality of "child" nodes links to a "parent" node, and thus forms a level of the hierarchy. The link relationship replicates and results in hierarchical tree 100. Each management agent represented by a node 110 routes messages up and down the hierarchy of tree 100, reports information collected from the computers for which the agent is responsible, to another agent in tree 110. Exemplary information includes status information such as whether a computer is active or inactive, the computer's workload, traffic, exceptional stage, etc.

The Node

A node 110 represents a management agent, such as a management server, a sensor, an actuator, or their equivalences. A management agent is comprised of software components, and may be referred to as a software package or a set of computer programs. Generally, management agents are installed into a computer of a data center providing the infrastructure for managing and controlling both hardware and software running on the data center's computers, and perform tasks such as monitoring, processing and disseminating management and control data, making decisions, actuating them, etc. These management agents, being software packages, can use the deployment techniques disclosed in this document. Once all software components are deployed for a particular management agent, a server, a sensor, or an actuator performs its corresponding assigned tasks.

A management server may include and thus manage a plurality of sensors and/or actuators, which provide data streams, report data to the management server, etc. A sensor collects information such as CPU utilization, machine temperature, the amount of data processed in a time period, etc.

An actuator performs tasks such as controlling the computer, initiating reboot and shutdown, executing database commands, etc. Typically, an actuator waits for an external command for the actuator to initiate an action while a sensor is self-initiating, usually in a time interval or on the occurrence of events such as when sensor thresholds are passed.

The Recursive Process

Deploying nodes 110 is automatic through a recursive process, including distributing, installing, and configuring software for each of the software packages represented by a management agent, into a computer. This computer, after the deployment process, may host more than one management agent. A node 110 may be an initiator node 110I or a leaf node 110L. Similarly, due to the nature of the recursive process, a child node of a node 110 may also be an initiator node 110I or a leaf node 110L. An initiator node 110I, having at least one child node, controls the deployment and configuration of its child nodes. A leaf node 110L, having no child node, stops the recursive process, while an initiator node 110I, having at least one child node, continues to deploy its child nodes, and thus continues the recursive deployment process. When all child nodes are leaf nodes, the recursive process stops. An initiator node 110I obtains information from a corresponding repository 120 that provides information related to the child nodes, e.g., whether a child node is an initiator node 110I or a leaf node 110L. A child node, when being an initiator node 110I, performs tasks of initiator nodes, i.e., continues to deploy its child nodes independently and in parallel to other initiator child nodes until the recursive deployment process stops. Typically, a system administrator determines the shape of tree 100, e.g., the number of nodes 110, the number of levels in tree 100, the types of management agents in a level, etc., by providing appropriate information in repositories 120 controlling the recursive deployment processes.

Once initiator nodes 110I have performed their functions of deploying their child nodes as management agents, initiator nodes 110I may be removed from the system. In one embodiment, they remain in the system and are used to remove nodes 110 from tree 100. In this situation, nodes 110 are also recursively removed. Instructions to remove nodes propagate from the top node 110T to leaf nodes 110L each of which is inactivated and/or removed from the system. Once all child nodes of a node 110I are removed from the system, the node 110I is removed from the system. The process propagates up to top node 110T.

Physical Connections of Nodes

Nodes 110 are connected via one or a plurality of communication links, which are mechanisms for nodes 110 to communicate with one another. A communication link may be a single network or a combination of networks that utilizes one or a combination of communication protocols such as the Transmission Control Protocol/Internet Protocol (TCP/IP), the Public Switched Telephone Network (PSTN), the Digital Subscriber Lines (DSL), the cable network, the satellite-compliant, the wireless-compliant, the Internet, etc. Examples of a communication link include network media, interconnection fabrics, rings, crossbars, etc. A node 110 may use a communication link different from that of another node 110.

The Repositories

Repositories 120 contain information about nodes 110, such as relationships among the nodes, references, identifiers or addresses of locations of installation programs or boot code, configuration information, etc. Repositories 120 also contain information that controls the deployment process of nodes 110, information to define tasks for each node 110, i.e., whether a particular node 110 is a server, a sensor, an actuator, etc. Normally, a system administrator determines the number of repositories 120, and provides configuration information to repositories 120 from which automated processes may start.

The number of repositories 120 used in FIG. 1 varies depending on factors such as the total number of nodes 110 in tree 100, the types of management agents represented by the nodes, etc. For illustration purposes, a repository 120 is associated with all nodes 110 in a level in tree 100. That is, repository 120(1) is associated with all nodes 110 in level 1; repository 120(2) is associated with all nodes 110 in level 2; repository 120(3) is associated with all nodes 110 in level 3, etc. Repository 120(1) thus provides relevant information for level-1 nodes; repository 120(2) provides information for level-2 nodes; repository 120(3) provides information for level-3 nodes, etc. In one embodiment, an initiator node 110I collects configuration information for its child nodes from a repository 120 designated for that particular node 110I.

In one embodiment, information maintained by a repository 120 includes references to bootable installation programs for the management agents, references to configuration data for the installation programs, and references to configuration data for the management agents to be deployed. Installation programs are the code booted for management agents. An installation program performs typical actions, such as creating directories, updating application configuration files, downloading more program files or libraries, etc., for the software packages represented by the management agents. Installation programs are shared for management agents having similar roles. For examples, servers share the same installation program for servers, sensors share the same installation program for sensors, actuators share the same installation program for actuators, etc. Installation programs may contain all the software components for the corresponding management agents. For example, an installation program for an initiator contains software components to form a program providing functions of an initiator; an installation program for a sensor contains software components to form a program providing functions of a sensor, an installation program for an actuator contains software components to form a program providing functions of an actuator, etc.

Configuration data for the installation programs are parameters and actions needed in installing a management agent. Configuration data together with installation programs provide platform or role-specific differences of management agents. Configuration data may be used in setting or testing specific environment variables, creating directories, etc., for the software components comprising a software package represented by a node 110.

Configuration data for management agents are parameters specific for a particular management instance. The data include, for example, environment settings, paths, and command line arguments for the software packages represented by a server, an initiator, a sensor, an actuator, etc., references to managed objects, references to other management agents such as parent, children, etc., in tree 100, interval tines for status reports, etc. In one embodiment, configuration data for a management agent are passed to the management agent when it is launched.

Actual components of installation programs and configuration data may be stored in repositories 120, but may also be stored in other forms or locations. For example, installation programs may be stored at a web site of a company providing management software while configuration data may be stored in another company's web site providing management services for customer environments. Alternatively, installation programs and configuration data may be stored in the same repository having the address of the repository as references. Each installation program may also obtain additional files and configuration data from other locations such as installation servers. Installation programs may refer to scripts written in appropriate languages such as Shell, Perl, Python, Java, etc.

In one embodiment, references to program code and configuration data needed for deploying management agents are stored as three separate lists, each of which corresponds to the installation programs, the configuration information for the installation programs, and the configuration information for the management agents. Upon receiving a request with the management agent's identifier, a repository 120 matches against patterns of all entries in each list. A repository 120 also returns references to installation programs or configuration data of entries with matching patterns. The boot stubs (explained in the following section), based on the references, obtain actual installation programs and configuration data.

Boot Stubs

A boot stub is a protocol handler that runs on a computer, which is able to host a management agent. The boot stub is responsible for handling the deployment protocols of one or more management agents or other software packages to be deployed on that computer. The boot stub receives control commands and messages from an initiator node 110I, e.g., when initiator node 110I requests the deployment of a node 110. Exemplary control commands include deploying, configuring, starting, activating, inactivating, etc., a management agent.

The boot stub receives information related to installation programs for management agents from a repository 120, installation configuration data, and configuration data for the management agents. In one embodiment, the information is in the form of references from which the boot stub obtains the actual data.

The boot stub also includes information on how to configure, start, and shutdown a program represented by a management agent. In one embodiment, the boot stub, in determining how to start a management agent, recognizes the file format, e.g., binary executable, Perl scripts, Java programs, etc. Further, the boot stub receives a string that represents the command line to start executing a program represented by a management agent.

In one embodiment, boots stub are in the form of a Java servlet. A boot stub uses HTTP to communicate with an initiator node 110I, and the communication message format is XML-based. When an installation program is launched, the boot stub provides the code with the appropriate environment and command-line parameters. However, boot stubs may be implemented in different ways, including, for example, daemon processes launched by inetd on Unix, etc. Normally, boot stubs are implemented in a way that they can launch installation code of different formats, e.g., Java classes, scripts or executable binaries according to the programs. A boot stub can also be part of the boot image of the computer hosting the boot stub and the management agent.

In one embodiment, on request of the initiator that deploys a management agent, a boot stub can reconfigure the management agent even after it has been deployed. Further, the boot stub modifies configuration parameters of the management agents and triggers the management agent to restart with the new configurations. In an alternative embodiment, the boot stub terminates the management agent, obtains a new configuration and/or new installation code and reruns the management agent installation code with new configurations.

Directories

Directories 130 are network services that provide boot-stub topology models and management-agent topology models. A directory 130 could be part of network information services (e.g., NIS), or part of a repository 120. A management-agent topology model provides information about the deployed management agents in a domain while a boot-stub topology model provides information about the location of boot stubs hosted on computers, the locations of the computers that are going to host management agents, and the type of management agents to be installed, i.e., whether a management agent is a server, an initiator, a sensor, etc. An initiator node 110I can use a boot-stub topology model to identify and locate computers that should host a management agent 110.

Topology models can be obtained in several ways. A program represented by a management agent initializes a directory 130 with computers that host a boot stub. When a computer boots and the boot stub on that computer is initialized, the boot stub sends a registration message to a pre-configured directory service responsible for registering the management agent. Alternatively, when a boot stub is initialized, it sends a broadcast message to find the directory service, and, once identifying the service, the boot stub registers with the service. Alternatively yet, a directory service periodically sends broadcast messages to find existing boot stubs, which reply to this broadcast with a registration message to the directory.

Assigning Identities to the Nodes

A management agent's identity or identifier is the information that uniquely identifies the agent when it communicates with other agents and/or entities. For example, management agents represented by nodes 110 use the identity to communicate with repositories 120 and/or directories 130 for registering information about nodes, looking up information about other nodes, etc. In one embodiment, identities of management agents are generated while tree 100 is being generated, based on defined rules. The identity of a child node is represented by a string concatenating the identity of the initiator node, and a unique identifier for the node. Examples of identifiers for nodes may include a number or a character or a sequence of characters. For illustration purposes, unique identifiers for nodes in level 1 may be named "region1," "region2," "region3," etc.; nodes in level 2 are named "zone1," "zone2," "zone3," etc.; nodes in level 3 are named "dc1," "dc2," "dc3," etc. For further illustration purposes, the identity of the top node or node 110T is "top," then the child nodes of node 110T, or the nodes in level 1, are named "top/region1," "top/region2," "top/region3," etc.

The child nodes of node "region1" are named "region1/zone1," "region1/zone2," "region1/zone3," etc. The child nodes of node "region1/zone3" are named "region1/zone3/dc1," "region1/zone3/dc2," "region/zone3/dc3," etc. The identity of a node 110 thus represents a path starting from the top level to the node. In the above example, a character "/" separates a level of tree 100, and is used in one embodiment. However, other characters, including, for example, "\", "&", etc., may be used.

Obtaining Deployment Data from Repositories

In one embodiment, repositories 120 use patterns to match identities of nodes 110 so that repositories 120 can provide information to nodes 110, e.g., when initiator nodes 110I seek information to deploy their child nodes. Repositories 120 provide nodes having similar characteristic with the same configuration file that provides similar configurations. Different patterns may be used to match the identities and thus provide different files for different configurations. Selecting a pattern is based on how tree 100 is desired, including the number of nodes 110, the number of levels, the types of management agents represented by the nodes in each level or in tree 100, etc. For example, nodes in one or several levels may be initiators using the same configuration files for configuring initiators; in a five child node to be deployed, three nodes may be sensors and use the same configuration file for configuring sensors while the other two nodes may be actuators and use the same configuration file for configuring actuators, etc.

FIG. 2 shows an example of how configuration files, and thus node configurations are selected, in accordance with one embodiment. In FIG. 2, levels 1–4 include initiator nodes while level five includes leaf nodes. Further, a "*" in between two "/" represents an entire level of tree 100, and, therefore, block entry 1 indicates that the file "regular.xml" is used to provide configuration data for all nodes in level 5 while block entry 2 indicates that the file "initiator.xml" is used to provide configuration data for all nodes in level 1 through level 4. Both files "regular.xml" and "initiator.xml" are referenced by an URL where //url_address indicates the address of the URL. In this example, if each initiator deploys 10 child nodes, then level 1 includes 10 nodes; level 2 includes 100 nodes; level three includes 1,000 nodes; level four includes 10,000 nodes; and level 5 includes 100,000 nodes.

Using patterns enables using the same configurations from the same configuration files. As seen in FIG. 2, only two configuration files "regular.xml" and "initiator.xml" are used for 100,000 nodes. Using patterns controls the recursive process. In FIG. 2, all nodes in the last level 5 of tree 100 use one configuration file "regular.xml" for configuring leaf-nodes, and, as the last level 5 includes all leaf nodes, the recursive process stops. Using patterns also avoids listing all names of nodes in repositories 120. In FIG. 2, only a few statements are executed to determine the corresponding configuration file. However, without using the pattern matching technique, 100,000 names would have to be matched, which burdens system resources.

Steps in Deploying Management Agents

Figure 3:
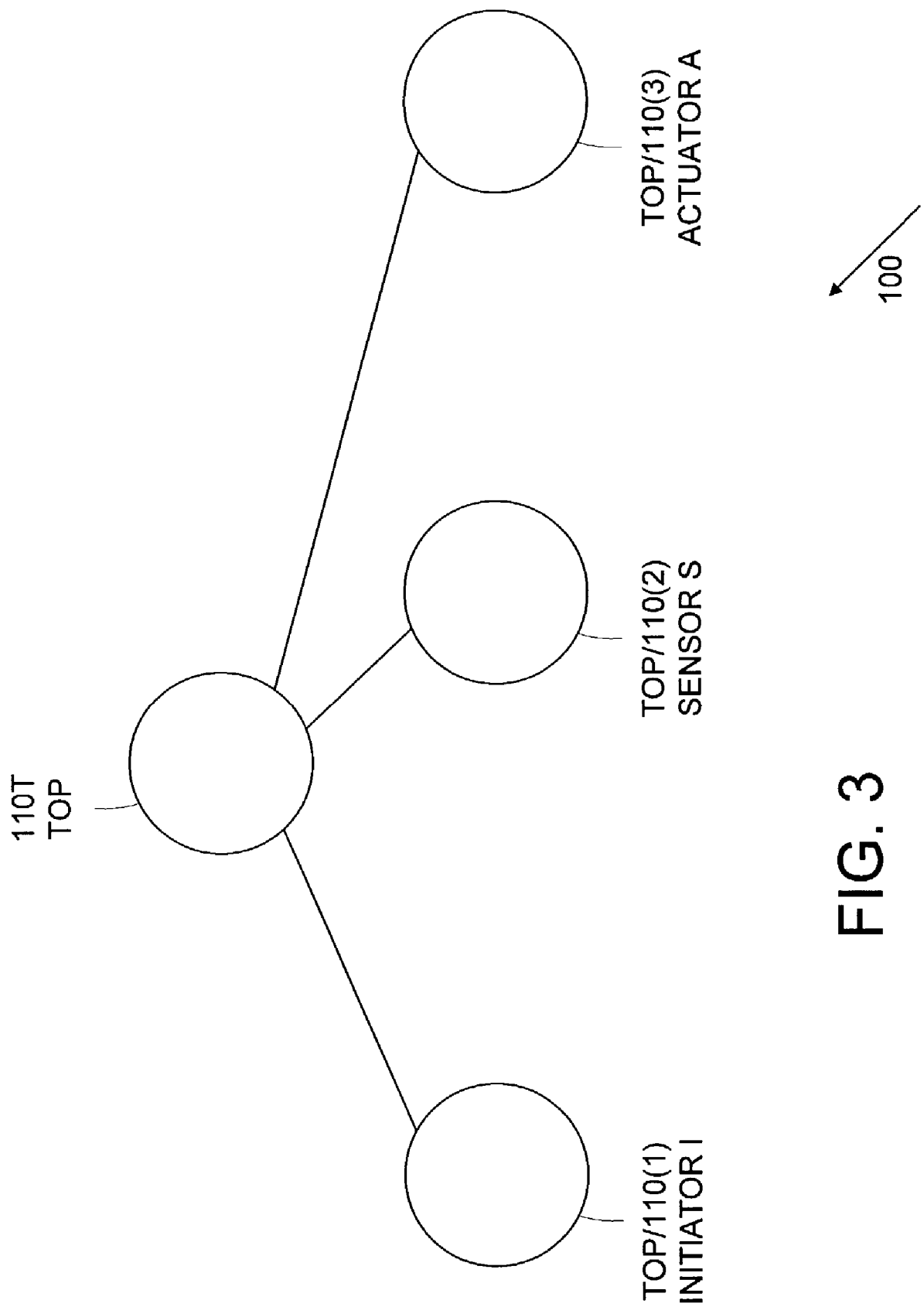
FIG. 3 shows a tree in the process of being deployed, in accordance with one embodiment.
Figure 4:
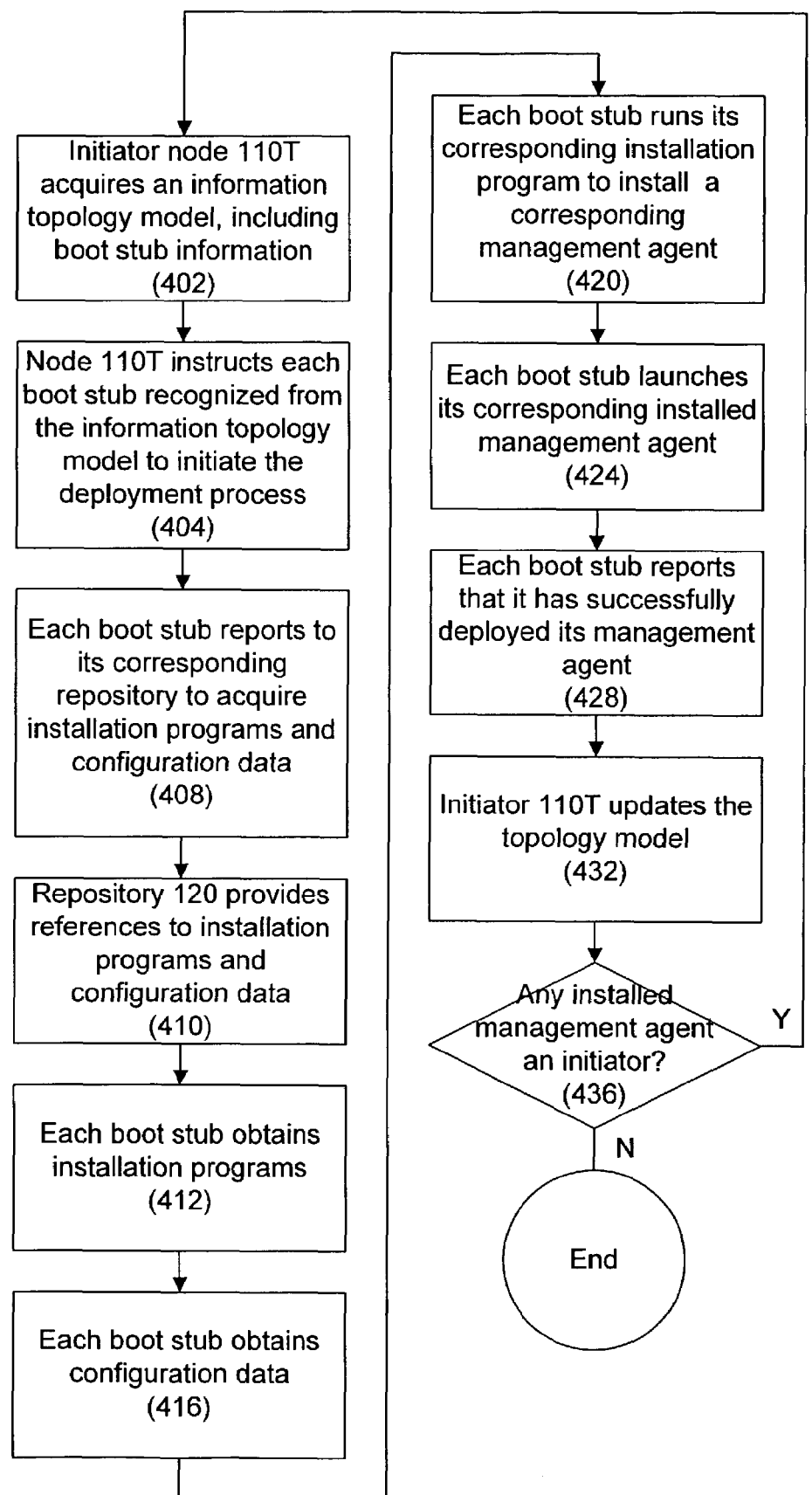
FIG. 4 is a flowchart illustrating steps in deploying the tree of FIG. 3.

FIG. 3 shows tree 100 having four nodes in the process of being deployed, and is used to illustrate the method steps in FIG. 4. FIG. 3 shows a top node 110T and three child nodes top/110(1), top/110(2), and top/110(3) of node 110T. Further, nodes top/110(1), top/110(2), and top/110(3) represent an initiator I, a sensor S, and an actuator A, respectively.

FIG. 4 is a flowchart illustrating steps in deploying nodes 110 of tree 100 in FIG. 3, in accordance with one embodiment. In step 402, initiator node 110T, provides its name to a corresponding directory 130 to acquire from this directory an information topology model for the nodes to be deployed. In this FIG. 4 example, the child nodes to be deployed are three nodes initiator I, sensor S, and actuator A. The topology model thus provides that node I is an initiator, node S is a sensor, and node A is an actuator, the locations of the boot stubs, and the locations of the computers that are going to host nodes I, S, and A. For illustration purposes, computers M(1), M(2), and M(3) store boot stubs B(1), B(2), and B(3), and are going to host initiator I, sensor S, and actuator A, respectively.

In step 404, initiator node 110T sends a message to each boot stub B(1), B(2), and B(3), and instructs each boot stub B(1), B(2), and B(3) to initiate the deployment process. That is, boot stub B(1) is to deploy initiator I in computer M(1), boot stub B(2) is to deploy sensor S in computer M(2), and boot stub B(3) is to deploy actuator A in computer M(3).

In step 408, boot stubs B(1), B(2), and B(3) communicate with their corresponding repositories 120 to obtain the installation programs and configuration data for deploying initiator I, sensor S, and actuator A in computers M(1), M(2), and M(3), respectively. For illustration purposes, boot stubs B(1), B(2), and B(3) report to repository 120(1), which also corresponds to all nodes in level one of the tree 100 to be generated. Consequently, repository 120(1) corresponds to child nodes of top node 110T, which are in level 1 of tree 100, and thus include initiator I, sensor S, and actuator A. Even though all boot stubs B(1), B(2), and B(3) report to repository 120(1), each acquires information for deploying an initiator, a sensor, and an actuator, to deploy initiator I, sensor S, and actuator A, respectively.

In step 410, repository 120(1) provides references to installation programs and configuration data. In one embodiment, these references are in the form of a uniform resource locator (URL), and show that installation programs and configuration data for initiators, sensors, and actuators are stored in locations LI, LS, and LA, respectively.

In step 412, each boot stub B(1), B(2), and B(3) obtains the installation programs for each initiator, sensor, and actuator from the referenced locations provided by repository 120(1). Boot stubs B(1), B(2), and B(3) thus obtain the installation programs from locations LI, LS, and LA respectively. The installation programs may contain all the software components for the corresponding initiator I, sensor S, and actuator A. Alternatively, each installation program obtains additional files and configuration data from other locations such as installation servers.

In step 416, boot stubs B(1), B(2), and B(3) obtain configuration data from the locations specified by repository 120(1), which are locations LI, LS, and LA for initiator I, sensor S, and actuator A, respectively. Configuration data include, for example, environment variables and initialization parameters that are passed to and used by the installation programs. In one embodiment, configuration data is in the form of XML documents from different locations.

In step 420, boot stubs B(1), B(2), and B(3), with the received installation data, run the installation programs that install initiator I in computer M(1), sensor S in computer M(2), and actuator A in computer M(3). An installation program performs typical actions, such as creating directories, updating application configuration files, downloading more program files or libraries, etc., for the software packages represented by initiator I, sensor S, and actuator A. After this step 420, necessary software is installed and configured so that initiator I, sensor S, and actuator A can perform their respective functions.

In step 424, to launch initiator I, sensor S, and actuator A, boot stubs B(1), B(2), and B(3) provide these management agents I, S, and A with corresponding configuration data. Initiator I, sensor S, and actuator A thus can start their corresponding functions.

In step 428, each boot stub B(1), B(2), and B(3), reports to initiator 110T that each boot stub has successfully deployed initiator I, sensor S, and actuator A, respectively.

In step 432, initiator 110T updates the management-agent topology model in directory 130 to reflect the new management agents in tree 100 that now includes initiator I, sensor S, and actuator A.

If, in step 436, it is determined that none of the newly installed management agent is an initiator, then the method ends. Otherwise, an initiator continues the deployment process, i.e., deploying its child nodes, using the above steps starting from step 402. In this FIG. 4 example, initiator I continues the deployment process.

In the above example, each computer M(1), M(2), and M(3) is installed with initiator I, sensor S, and actuator A, respectively. However, a computer may be installed with more than one management agent of the same or different types. Normally, each management agent of the same type is responsible for a different function. For example, computer M(1) may be installed with initiator I and a first instance of a sensor S1; computer M(2) may be installed with a second instance of sensor S1, a sensor S2, a sensor S3, and computer M(3) may be installed with a few actuators, one or more sensors, etc. All instances of sensor S1 may be measuring CPU utilization, sensor S2 may be monitoring input/output traffic, actuator A1 may be calculating statistical distribution of CPU utilization over a time period, etc.

Computer System Overview

Figure 5:
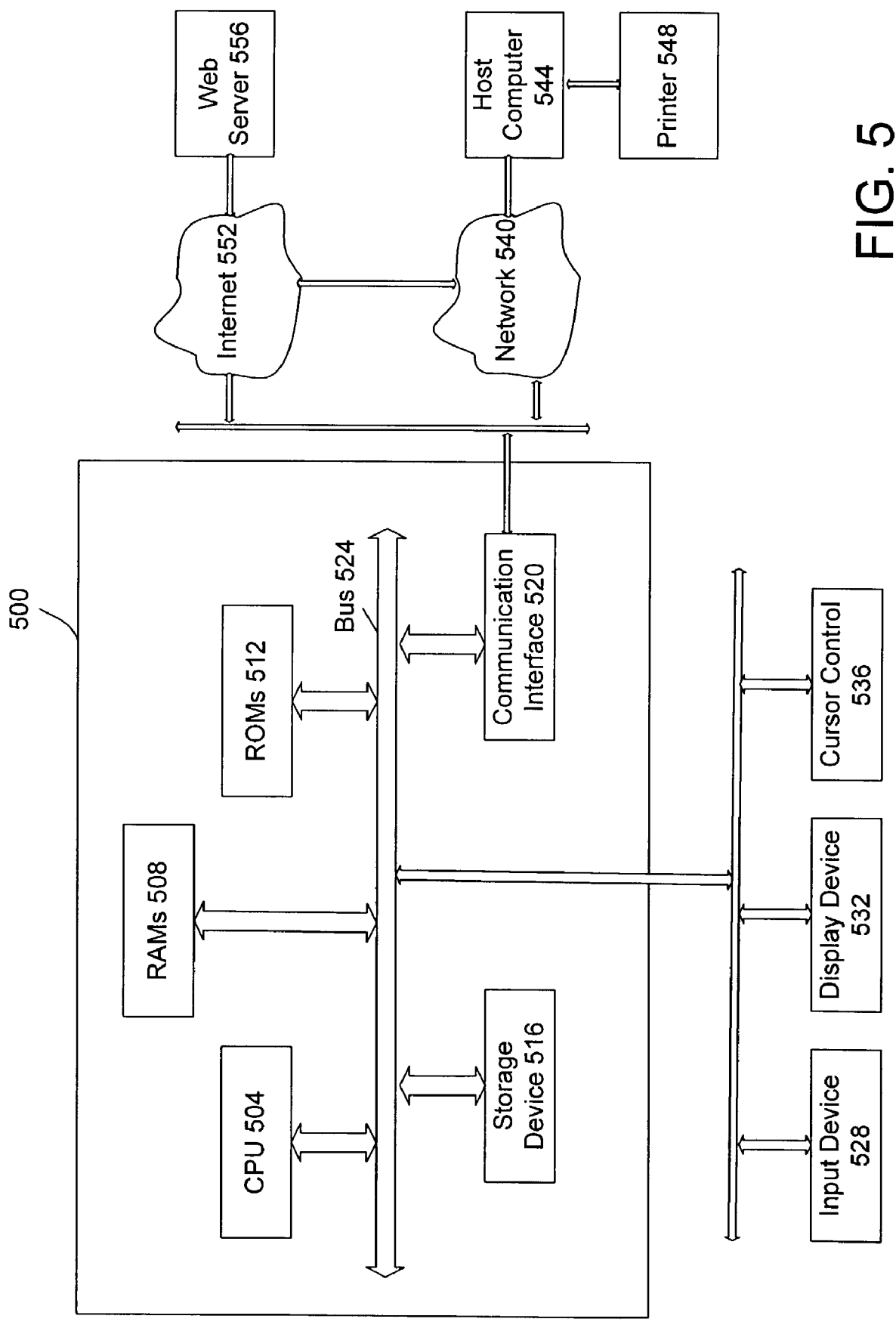
FIG. 5 shows a computer system upon which embodiments of the invention may be implemented.

FIG. 5 is a block diagram showing a computer system 500 upon which embodiments of the invention may be implemented. For example, computer system 500 may be implemented to store a boot stub, to host management agents, to perform functions in accordance with the techniques described above, etc. In one embodiment, computer system 500 includes a central processing unit (CPU) 504, random access memories (RAMs) 508, read-only memories (ROMs) 512, a storage device 516, and a communication interface 520, all of which are connected to a bus 524.

CPU 504 controls logic, processes information, and coordinates activities within computer system 500. In one embodiment, CPU 504 executes instructions stored in RAMs 508 and ROMs 512, by, for example, coordinating the movement of data from input device 528 to display device 532. CPU 504 may include one or a plurality of processors.

RAMs 508, usually being referred to as main memory, temporarily store information and instructions to be executed by CPU 504. Information in RAMs 508 may be obtained from input device 528 or generated by CPU 504 as part of the algorithmic processes required by the instructions that are executed by CPU 504.

ROMs 512 store information and instructions that, once written in a ROM chip, are read-only and are not modified or removed. In one embodiment, ROMs 512 store commands for configurations and initial operations of computer system 500.

Storage device 516, such as floppy disks, disk drives, or tape drives, durably stores information for use by computer system 500.

Communication interface 520 enables computer system 500 to interface with other computers or devices. Communication interface 520 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 520 may also allow wireless communications.

Bus 524 can be any communication mechanism for communicating information for use by computer system 500. In the example of FIG. 5, bus 524 is a media for transferring data between CPU 504, RAMs 508, ROMs 512, storage device 516, communication interface 520, etc.

Computer system 500 is typically coupled to an input device 528, a display device 532, and a cursor control 536. Input device 528, such as a keyboard including alphanumeric and other keys, communicates information and commands to CPU 504. Display device 532, such as a cathode ray tube (CRT), displays information to users of computer system 500. Cursor control 536, such as a mouse, a trackball, or cursor direction keys, communicates direction information and commands to CPU 504 and controls cursor movement on display device 532.

Computer system 500 may communicate with other computers or devices through one or more networks. For example, computer system 500, using communication interface 520, communicates through a network 540 to another computer 544 connected to a printer 548, or through the world wide web 552 to a server 556. The world wide web 552 is commonly referred to as the "Internet." Alternatively, computer system 500 may access the Internet 552 via network 540.

Computer system 500 may be used to implement the techniques described above. In various embodiments, CPU 504 performs the steps of the techniques by executing instructions brought to RAMs 508. In alternative embodiments, hard-wired circuitry may be used in place of or in combination with software instructions to implement the described techniques. Consequently, embodiments of the invention are not limited to any one or a combination of software, firmware, hardware, or circuitry.

Instructions executed by CPU 504 may be stored in and/or carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic or electromagnetic waves, capacitive or inductive coupling, etc. As an example, the instructions to be executed by CPU 504 are in the form of one or more software programs and are initially stored in a CD-ROM being interfaced with computer system 500 via bus 524. Computer system 500 loads these instructions in RAMs 508, executes some instructions, and sends some instructions via communication interface 520, a modem, and a telephone line to a network, e.g. network 540, the Internet 552, etc. A remote computer, receiving data through a network cable, executes the received instructions and sends the data to computer system 500 to be stored in storage device 516.

In the foregoing specification, the invention has been described with reference to specific embodiments. However, it will be evident that various modifications and changes may be made without departing from the broader spirit and scope of the invention. Accordingly, the specification and drawings are to be regarded as illustrative rather than as restrictive.

What is claimed is:

1. A method for recursively deploying a plurality of software packages including a first package and a second package, comprising the steps of:
    deploying the first package, thereby providing a first program corresponding to the first package and running on a first computer system; and
    the first program automatically deploying the second package, thereby providing a second program corresponding to the second package and running on a computer system selected from the first computer system and a second computer system;
    wherein deploying the second package includes the steps of
      identifying a boot stub responsible for deploying the second package;
      instructing the boot stub to deploy the second package;
      the boot stub acquiring an installation program; and
      the boot stub using the installation program to install the second package.

2. The method of claim 1 wherein deploying the second package includes one or a combination of acquiring configuration data for the installation program and acquiring configuration data for the second program.

3. The method of claim 2 wherein a repository stores one or a combination of a reference to the installation program, a reference to configuration data for the installation program, and a reference to configuration data for the second program.

4. The method of claim 3 wherein the boot stub uses the reference to the installation program to locate the installation program, the reference to the configuration data for the installation program to locate the configuration data for the installation program, and the reference to the configuration data for the second program to locate the configuration data for the second program.

5. The method of claim 1 wherein deploying the second package includes the boot stub reporting that it has successfully deployed the second package.

6. The method of claim 1 wherein deploying the second package includes updating a topology model to reflect that the second package has been successfully deployed.

7. The method of claim 1 wherein the second program is selected from a group consisting of an initiator, a server, an actuator, and a sensor.

8. The method of claim 1 wherein if the second program is an initiator, then the second program automatically deploys a third package, thereby providing a third program corresponding to the third package and running on a computer system selected from the first computer system, the second computer system, and a third computer system.

9. The method of claim 1 wherein identifying the boot stub uses a network service.

10. A method for recursively deploying a plurality of software packages, comprising the steps of:
    a) deploying a first number of software packages, thereby providing a first number of programs corresponding to the first number of software packages;
    b) identifying a number of initiator programs from the first number of programs; and
    c) for each initiator program, performing the steps of automatically deploying a set of software packages, thereby providing a set of programs corresponding to the set of software packages; and
    for each set of programs identifying a number of initiator programs, and going to step c).

11. A method for recursively deploying a plurality of software packages including a first package and a second package, comprising the steps of:
    deploying the first package, thereby providing a first program corresponding to the first package and running on a first computer system; the first program having a first unique identifier;
    the first program automatically deploying the second package, thereby providing a second program corresponding to the second package and running on a computer system selected from the first computer system and a second computer system; the second program having a second unique identifier; and wherein creating the second unique identifier based on the first unique identifier; wherein creating the unique second identifier comprises the step of conceatenating the firt unique identifier with a third unique identifier associated with the second program.

12. The method of claim 11 further comprises the steps of representing the first program by a first node, representing the second program by a second node, and creating an identifier of the second node based on an identifier of the first node.

13. A method for recursively deploying a plurality of software packages, comprising the steps of:
    deploying a first package, thereby providing a first program corresponding to the first package and running on a first computer system;
    the first program automatically deploying a first set of packages, thereby providing a first set of programs each of which corresponding to a package of the first set of packages;
    wherein deploying a package of the first set of packages includes the step of acquiring a configuration file that store configuration information for the package by using a pattern indicating the relationship between a plurality of programs corresponding to the plurality of software packages.

14. The method of claim 13 wherein a first relationship corresponds to a first configuration file and a second relationship corresponds to a second configuration file.

15. The method of claim 13 wherein the first set of programs includes at least one program that deploys a second set of software packages, thereby providing a second set of programs each of which corresponding to a package of the second set of packages.

16. A computer-readable storage medium embodying instructions for performing a method for recursively deploying a plurality of software packages including a first package and a second package, the method comprising the steps of: deploying the first package, thereby providing a first program corresponding to the first package and running on a first computer system; and the first program automatically deploying the second package, thereby providing a second program corresponding to the second package and running on a computer system selected from the first computer system and a second computer system; wherein deploying the second package includes the steps of identifying a boot stub responsible for deploying the second package; instructing the boot stub to deploy the second package; the boot stub acquiring an installation program; and the boot stub using the installation program to install the second package.

17. The computer-readable storage medium of claim 16 wherein deploying the second package includes one or a combination of acquiring configuration data for the installation program and acquiring configuration data for the second program.

18. The computer-readable storage medium of claim 17 wherein a repository stores one or a combination of a reference to the installation program, a reference to configuration data for the installation program, and a reference to configuration data for the second program are stored in.

19. The computer-readable storage medium of claim 18 wherein the boot stub uses the reference to the installation program to locate the installation program, the reference to the configuration data for the program to locate the configuration data for the program, and the reference to the configuration data for the second program to locate the configuration data for the second program.

20. The computer-readable storage medium of claim 16 wherein deploying the second package includes the boot stub reporting that it has successfully deployed the second package.

21. The computer-readable storage medium of claim 16 wherein deploying the second package includes updating a topology model to reflect that the second package has been successfully deployed.

22. The computer-readable storage medium of claim 16 wherein the second program is selected from a group consisting of an initiator, a server, an actuator, and a sensor.

23. The computer-readable storage medium of claim 16 wherein if the second program is an initiator, then the second program automatically deploys a third package, thereby providing a third program corresponding to the third package and running on a computer system selected from the first computer system, the second computer system, and a third computer system.

24. The computer-readable storage medium of claim 16 wherein identifying the boot stub uses a network service.

25. A computer-readable storage medium embodying instructions for performing a method for recursively deploying a plurality of software packages, the method comprising the steps of: a) deploying a first number of software packages, thereby providing a first number of programs corresponding to the first number of software packages; and b) identifying a number of initiator programs from the first number of programs; and c) for each initiator program, performing the steps of automatically deploying a set of software packages, thereby providing a set of programs corresponding to the set of software packages; and for each set of programs identifying a number of initiator programs, and going to step c).

26. A computer-readable storage medium embodying instructions for performing a method for recursively deploying a plurality of software packages including a first package and a second package, the method comprising the steps of:

deploying the first package, thereby providing a first program corresponding to the first package and running on a first computer system; the first program having a first unique identifier;

the first program automatically deploying the second package, thereby providing a second program corresponding to the second package and running on a computer system selected from the first computer system and a second computer system; the second program having a second unique identifier; and wherein creating the second unique identifier based on the first unique identifier; wherein creating the unique second identifier comprises the step of concatenating the first unique identifier with a third unique identifier associated with the second program.

27. The computer-readable storage medium of claim 26 wherein the method further comprises the steps of representing the first program by a first node, representing the second program by a second node, and creating an identifier of the second node based on an identifier of the first node.

28. A computer-readable storage medium embodying instructions for performing a method for recursively deploying a plurality of software packages, the method comprising the steps of:

deploying a first package, thereby providing a first program corresponding to the first package and running on a first computer system; the first program automatically deploying a first set of packages, thereby providing a first set of programs each of which corresponding to a package of the first set of packages; wherein deploying a package of the first set of packages includes the step of acquiring a configuration file that store configuration information for the package by using a pattern indicating the relationship between a plurality of programs corresponding to the plurality of software packages.

29. The computer-readable storage medium of claim 28 wherein a first relationship corresponds to a first configuration file and a second relationship corresponds to a second configuration file.

30. The computer-readable storage medium of claim 28 wherein the first set of programs includes at least one program that deploys a second set of software packages, thereby providing a second set of programs each of which corresponding to a package of the second set of packages.

* * * * *

UNITED STATES PATENT AND TRADEMARK OFFICE
CERTIFICATE OF CORRECTION

| | | |
|---|---|---|
| PATENT NO. | : 7,150,014 B2 | Page 1 of 1 |
| APPLICATION NO. | : 10/264468 | |
| DATED | : December 12, 2006 | |
| INVENTOR(S) | : Sven Graupner et al. | |

It is certified that error appears in the above-identified patent and that said Letters Patent is hereby corrected as shown below:

In column 12, line 24, in Claim 11, delete "conceatenating the firt" and insert -- concatenating the first --, therefor.

Signed and Sealed this

Twenty-eighth Day of April, 2009

JOHN DOLL
*Acting Director of the United States Patent and Trademark Office*